United States Patent [19]

Mignien

[11] Patent Number: 4,773,729
[45] Date of Patent: Sep. 27, 1988

[54] CONNECTION BOX FOR OPTICAL FIBER CABLES

[75] Inventor: Georges Mignien, Leulinghen-Bernes, France

[73] Assignee: Les Cables de Lyon, Clichy, France

[21] Appl. No.: 127,142

[22] Filed: Dec. 1, 1987

[30] Foreign Application Priority Data

Dec. 5, 1986 [FR] France .............................. 86 17063

[51] Int. Cl.$^4$ .............................................. G02B 6/38
[52] U.S. Cl. .............................. 350/96.21; 350/96.22
[58] Field of Search ............... 350/96.20, 96.21, 96.22, 350/96.23; 174/68 R, 70 R, 70 S, 72 R, 74 R, 74 A, 99 R

[56] References Cited

U.S. PATENT DOCUMENTS

| | | | |
|---|---|---|---|
| 4,516,830 | 5/1985 | Guazzo | 350/96.22 |
| 4,545,645 | 10/1985 | Mignien | 350/96.21 |
| 4,595,256 | 6/1986 | Guazzo | 350/96.21 |
| 4,601,536 | 7/1986 | Guazzo | 350/96.20 |
| 4,664,471 | 5/1987 | Mignien et al. | 350/96.21 |

FOREIGN PATENT DOCUMENTS

| | | | |
|---|---|---|---|
| 66829 | 12/1982 | European Pat. Off. | 350/96.21 |
| 83101 | 7/1983 | European Pat. Off. | 350/96.21 |
| 2515363 | 4/1982 | France | 350/96.21 |

OTHER PUBLICATIONS

Patent Abstracts of Japan, vol. 6, No. 141 (P-131) (1019), Jul. 30, 1982; & JP-A-57 64 205 (Nippon Denshin Denwa Kosha) 4/19/82 "Structure of Connecting Part of Optical Fiber Cable" (Abstract).

Primary Examiner—William L. Sikes
Assistant Examiner—Frank González
Attorney, Agent, or Firm—Sughrue, Mion, Zinn, Macpeak & Seas

[57] ABSTRACT

Inside a container tube (7) which is closed by two covers (8, 8') fixed to the cables to be connected, this connection box comprises a cylindrical tank (27, 17, 17') for storing optical fibers (3, 3') with the inside cylindrical volume of the tank being delimited at each of its ends by respective conical surfaces (24, 24') leading to narrow passages (40, 40') through which the optical fibers (3, 3') pass on their way from the covers (8, 8'), said tank having a large side opening (27) enabling the ends of the optical fibers (3, 3') to be taken out from the tank for the purpose of being connected and then enabling them to be reinserted together with their connectors (28). In the vicinity of each of its conical ends, the inside volume of the tank has respective annular recesses (29, 29') of greater diameter into which the spare lengths of the optical fibers (3, 3') have a natural tendency to coil.

9 Claims, 1 Drawing Sheet

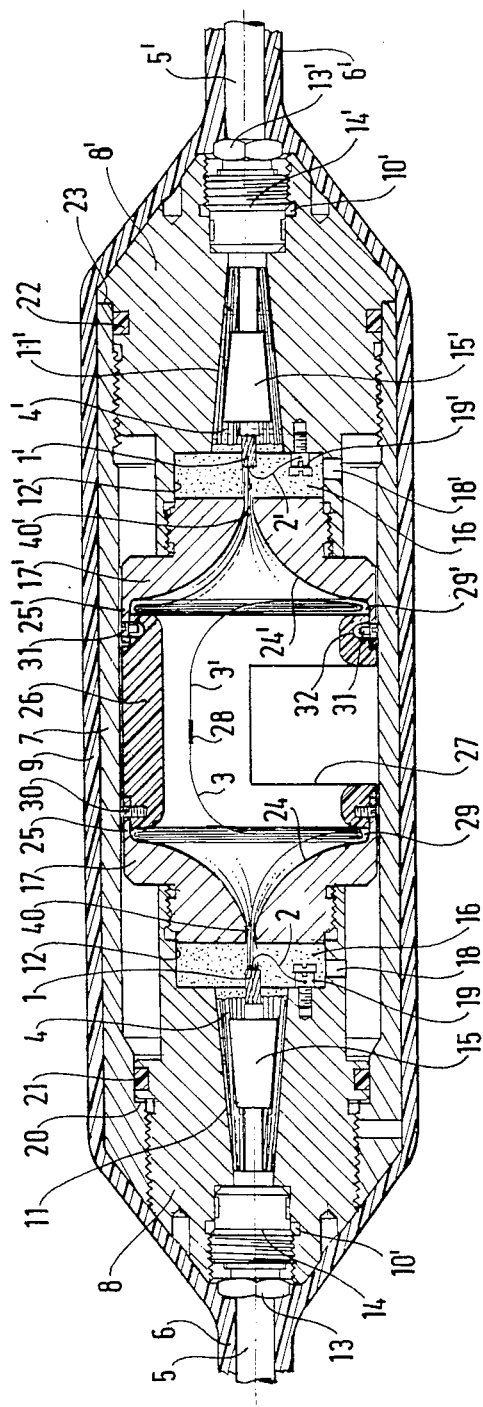

CONNECTION BOX FOR OPTICAL FIBER CABLES

The present invention relates to connecting optical fiber cables, in particular optical fiber underwater cables for use in transmission links.

BACKGROUND OF THE INVENTION

In general, optical fiber cables comprise a protective sheath often made of composite material and include a set of optical fibers which are disposed either with or without reserves of extra length in or around a carrier element which protects them against traction forces.

When connecting optical fiber cables, the optical fibers must be glued or welded end-to-end while conserving any spare length. The carrier elements must be interconnected and the protective sheath must be reconstituted. This is all done using connection boxes such as that described in French patent No. 2 519 149 (equals U.S. Pat. No. 4,516,830). The connection box is in the form of a container tube which is closed at both ends by covers which are fixed to the cable carrier elements and through which the optical fibers pass, with the outside of the tube being coated with a protective sheath which is connected to the sheaths of the cables. The container tube constitutes a splice box for the optical fibers and together with its covers it provides mechanical continuity for the carrier elements of the cables being connected. It encloses a cylindrical mandrel which is used as a support on to which the ends of the pairwise connected optical fibers are wound, with the ends of the mandrel being hollow and provided with lateral openings through which the optical fibers pass after passing through the covers for the purpose of connection around the periphery thereof.

This type of connection box suffers from the drawback of not protecting the optical fibers from risks due to the twisting to which they may be subjected, in particular on passing through the mandrel and also in the event of pinching due to a handling error by an operator when the container tube is being put into place over the mandrel when the box is being closed. The present invention seeks to avoid these drawbacks while facilitating connection operations.

SUMMARY OF THE INVENTION

The present invention provides a connection box for optical fiber cables, the box comprising a container tube closed at each end by a respective cover through which the optical fibers of the cables to be connected pass, the connection box including a cylindrical tank for storing the optical fibers received inside the container tube, with the cylindrical inside volume of the tank being limited at each of its ends by respective conical surfaces leading to narrow passages through which the optical fibers pass on coming from the covers, the tank also having a large side opening enabling the ends of the optical fibers of the cables to be extracted for end-to-end connection and enabling them to be reinserted together with their connectors inside the cylindrical storage tank.

Preferably, each of the conical surfaces delimiting one of the ends of the inside volume of the cylindrical storage tank has an axial section which is convex with a radius of curvature which is greater than the minimum radius of curvature which the optical fibers can withstand without damage.

The inside volume of the cylindrical storage tank may have two annular inside recesses, one in the vicinity of each of its conical ends and each being of larger diameter than the central portion, with spare lengths of the optical fibers tending to coil into the recesses when the optical fibers are returned inside the tank through the side opening.

The optical fibers are protected against risks due to excessive bending inside the storage tank by the rounded shapes of its inside wall. In addition, there is no longer any risk of twisting or pinching when the container tube is being put into place over the covers since the fibers are completely contained inside the storage tank.

BRIEF DESCRIPTION OF THE DRAWING

An embodiment of the invention is described by way of example, with reference to the accompanying drawing whose sole figure is an axial section through a connection box in accordance with the invention and put in place between two optical fiber cables.

MORE DETAILED DESCRIPTION

The connection box shown is intended for use with an optical fiber underwater cable which is constituted, as can be seen by the ends of the cable where they enter the connection box, by an optical core comprising a plastic rod 1, 1' reinforced by a central strand 2, 2' and having helical grooves formed in the periphery thereof in which optical fibers 3, 3' are disposed together with possible spare length, a carrier and protector element constituted by an arch of steel wires 4, 4' which are covered by a copper tube 5, 5' which provides sealing and which serves as an electrical conductor for a remote power supply, and an outer protecting and insulating sheath 6, 6' made of polyethylene.

The connection box includes a metal container tube 7 which is closed at both ends by screw-on metal covers 8 and 8' which are anchored to the arches of steel wires 4 and 4' of the cables to be connected and which are in electrical contact with their copper tubes 5 and 5', said box protecting the optical fiber connections and additionally providing mechanical continuity between the carrier elements and electrical continuity between the copper tubes of the cables to be connected. The assembly constituted by the container tube 7 and the covers 8 and 8' is coated on the outside with a polyethylene protective insulating sheath 9 which provides continuity between the outer protective insulating sheaths 6 and 6' of the cables to be connected.

Each of the covers 8 and 8' has a bore through which one end of a cable to be connected passes, and running from the outside of the connection box this bore comprises a cylindrical inlet chamber 10 or 10' having a tapped side wall, followed by a conical flare 11 or 11' which flares towards the inside of the connection box and which is terminated by a cylindrical outlet chamber 12 or 12' which is likewise tapped on its inside edge.

The cylindrical inlet chamber 10 or 10' houses a metal stop part for the end of the copper tube 5 or 5'. This stop part comprises two conical sleeves threaded over the end of the copper tube 5 or 5' and screwed together, with the inside sleeve 13 or 13' being deformable under action from the outside sleeve 14 or 14' and clamping the copper tube 5 or 5' against the arch of steel wires 4 or 4', and with the outer sleeve 14 or 14' screwing into the tapping of the inside wall of the cylindrical inlet chamber 10 or 10'.

The conical flare 11 or 11' serves to anchor the cover 8 or 8' to the end of the arch of steel wires 4 or 4' of the cables to be connected. It contains a conical ring 15 or 15' through which the optical core of the cable passes and which is engaged inside the arch of steel wires 4 or 4' in such a manner as to splay them out. It is filled with epoxy resin 16 which seals and positions the ends of the steel wires 4 or 4'.

The cylindrical outlet chamber 12 or 12' is closed by the screw threaded base of a funnel-shaped part 17 or 17' which has a narrow axial passage 40 or 40' for the optical fibers 3 or 3'. It serves to provide a sealing barrier level with the optical cores of the cables to be connected and it is filled at the same time as the conical flare 11 or 11' with epoxy resin which is inserted via a side opening 18 or 18'. The grooved rod 1 or 1' of the cable to be connected stops in the cylindrical outlet chamber 12 or 12' with the reinforcing cable 2 or 2' of the rod being connected to a screw terminal 19 or 19' which is fixed to the wall of the chamber.

The outside diameters of the covers 8 and 8' which screw into the ends of the container tube 7 are not the same. The smaller diameter cover 8 has an outside thread running from the outside of the connection box and coming into abutment on the inside of the connection box with a grooved outwardly directed shoulder 20 receiving an O-ring 21. The larger diameter cover 8' has an outside thread which begins on the inside of the connection box and which terminates to the outside of the connection box at an annular groove which receives an O-ring 22 followed by an outwardly directed shoulder 23. These different outer profiles of the covers 8 and 8', which are matched in complementary manner by the inside profiles of the ends of the container tube 7, facilitate assembly since they enable the container tube 7 to be temporarily threaded over the end of the cable fixed to the cover 8 prior to being brought back into place at the end of a connection operation and screwed simultaneously on to both covers 8 and 8'.

The funnel shaped parts 17 and 17' constitute the ends of a cylindrical tank for storing optical fibers inside the container tube 7. Their flared-out sides expand smoothly from the narrow axial passages 40 and 40' through which the optical fibers 3 and 3' pass out to the diameter of the inside cylindrical volume of the storage tank, following an inside profile 24 or 24' having a generally conical surface whose axial section is convex with a radius of curvature that is greater than the minimum radius of curvature which the optical fibers 3 and 3' can withstand without damage, and it terminates in a cylindrioal lip 25 or 25'.

The side wall of the cylindrical storage tank comprises a cylindrical spacer 26 made of plastic which is rounded in shape and which is provided with a large side opening 27 enabling the ends of the optical fibers 3 and 3' to be extracted to enable them to be connected pairwise and end-to-end outside the tank, and then allowing them to be reinserted together with their connections 28 inside the storage tank without ever subjecting them to radiuses of curvature which are smaller than those which they can withstand without damage. The cylindrical spacer 26 engages at opposite ends within the lips 25 and 25' at the flared ends of the funnel shaped part 17 and 17', but it does not fully engage therein so as to leave two larger diameter circular recesses 29 and 29' at each end of the cylindrical storage tank in which the spare lengths of optical fiber 3 and 3' tend naturally to coil when the fibers are pushed back into the storage tank through its side opening 27, said circular recesses 29 and 29' in any case being of greater diameter than the minimum turn diameter allowable for the optical fibers 3 and 3'.

The cylindrical spacer 26 is fixed to the funnel-shaped part 17 by a set of peripheral screws 30 and it is fixed to the other funnel shaped part 17' by a system of peripheral pegs 31 which slide in an annular groove 32 allowing rotation and a small amount of slack between the parts so as to prevent the two covers 8 and 8' being fixed together via the spacer 26 and the funnel-shaped parts 17 and 17', thereby enabling the covers to be independently clamped relative to the container tube 7.

Without going beyond the scope of the invention it is possible to modify various dispositions or to replace various means by equivalent means. The above-described connection box may be adapted, in particular, to connecting optical fiber cables in which the structure of the core or of the carrier element is different from that used as an example. This is done by appropriate modification to the covers 8 and 8'. Similarly, it may be used for interconnecting two optical cables which are different in structure from each other, with the two covers 8 and 8' being adapted to the structure of each of the cables.

I claim:

1. A connection box for optical fiber cables, the box comprising a container tube closed at its ends by two covers through which the optical fibers of the cables to be connected pass, the connection box including a cylindrical tank for storing the optical fibers received inside the container tube, with the cylindrical inside volume of the tank being limited at each of its ends by respective conical surfaces leading to narrow passages through which the optical fibers pass on coming from the covers, the tank also having a large side opening enabling the ends of the optical fibers of the cables to be extracted for end-to-end connection and enabling them to be reinserted together with their connectors inside the cylindrical storage tank.

2. A connection box according to claim 1, wherein the conical surfaces delimiting the ends of the inside volume of the cylindrical storage tank have a convex axial section whose radius of curvature is greater than the minimum radius of curvature which the optical fibers can withstand without damage.

3. A connection box according to claim 1, wherein the inside volume of the cylindrical storage tank has two annular inside recesses, one in the vicinity of each of its conical ends and each being of larger diameter than the central portion, spare lengths of the optical fibers tending to coil into the recesses when the optical fibers are returned inside the tank through the side opening.

4. A connection box according to claim 1, wherein the cylindrical optical fiber storage tank is constituted by a cylindrical spacer provided with a large side opening and disposed between two funnel-shaped parts whose flared ends face towards each other.

5. A connection box according to claim 4, wherein each of said funnel-shaped parts has a conical surface inside wall in its flared side running from the narrow passage through which the optical fibers pass, with the axial section of said conical surface being convex and having a radius of curvature which is greater than the minimum radius of curvature which the optical fibers can withstand without damage.

6. A connection box according to claim 4, wherein each of the funnel-shaped parts has a peripheral cylindrical lip at its flared end into which one of the ends of the cylindrical spacer is received.

7. A connection box according to claim 6, wherein the cylindrical spacer is not fully inserted into the cylindrical lips of the funnel-shaped parts, thereby leaving larger diameter annular recesses in the vicinity of the bottoms of said lips, into which recesses spare lengths of optical fiber tend to coil when the fibers are returned into the storage tank via the side opening.

8. A connection box according to claim 1, including means for fixing the cylindrical storage tank to the two covers of the container tube while leaving said covers free to rotate relative to each other and also allowing a degree of slack therebetween.

9. A connection box according to claim 8, wherein said fixing means comprise a rotary mechanical connection constituted by a set of pegs sliding in an annular groove.

* * * * *